United States Patent
Buehler

(12)
(10) Patent No.: US 6,589,484 B2
(45) Date of Patent: Jul. 8, 2003

(54) ONE-PIECE PIPETTE/DROPPER ASSEMBLY AND THE METHOD OF MAKING SAME

(76) Inventor: John D. Buehler, 20 Bishops Run La., Bridgeton, NJ (US) 08302

( * ) Notice: Subject to any disclaimer, the term of this patent is extended or adjusted under 35 U.S.C. 154(b) by 0 days.

(21) Appl. No.: 09/749,977

(22) Filed: Dec. 28, 2000

(65) Prior Publication Data

US 2001/0048898 A1 Dec. 6, 2001

Related U.S. Application Data

(60) Provisional application No. 60/174,188, filed on Dec. 29, 1999.

(51) Int. Cl.⁷ ................................................. B01L 3/02
(52) U.S. Cl. ..................... 422/100; 73/863.32; 73/864; 73/864.01; 73/864.02; 73/864.11
(58) Field of Search ....................... 422/100; 73/863.32, 73/864, 864.01, 864.02, 864.11

(56) References Cited

U.S. PATENT DOCUMENTS

| | | | |
|---|---|---|---|
| 3,748,909 A | * | 7/1973 | Kuo ............................ 422/100 |
| 3,834,241 A | * | 9/1974 | Garren et al. ................ 222/209 |
| 3,938,392 A | | 2/1976 | Rodrigues |
| 4,022,576 A | * | 5/1977 | Parker ......................... 422/100 |
| D250,599 S | * | 12/1978 | St. Amand ................... D24/55 |
| RE31,555 E | * | 4/1984 | Garren et al. ............. 73/864.11 |
| 4,563,104 A | | 1/1986 | Saint-Amand |
| 4,779,768 A | * | 10/1988 | St. Amand .................... 141/24 |
| 4,806,313 A | | 2/1989 | Ebersole et al. |
| 4,808,381 A | * | 2/1989 | McGregor et al. .......... 215/307 |
| 5,073,347 A | | 12/1991 | Garren et al. |
| 5,078,970 A | * | 1/1992 | Teodorescu et al. ......... 422/100 |
| 5,169,602 A | * | 12/1992 | Pang et al. .................. 215/247 |
| 5,192,511 A | | 3/1993 | Roach |
| 5,406,856 A | * | 4/1995 | Kuhn ....................... 73/864.11 |
| 5,425,920 A | | 6/1995 | Conti et al. |
| 5,775,546 A | * | 7/1998 | Buehler ....................... 222/209 |
| 5,879,635 A | * | 3/1999 | Nason ......................... 206/209 |
| 5,916,813 A | | 6/1999 | Gorog |
| 6,030,582 A | * | 2/2000 | Levy ........................... 215/247 |
| 6,343,717 B1 | * | 2/2002 | Zhang et al. ............... 222/209 |

* cited by examiner

*Primary Examiner*—Jill Warden
*Assistant Examiner*—B. R. Gordon

(57) ABSTRACT

The present invention provides a one-piece pipette/dropper assembly that includes a pipette portion, a threaded cap portion, and bulb portion. The cap potion has a top wall including a top and bottom surface and the bulb portion has a first end integrally formed with the top wall of the cap on the top surface. The pipette portion has a first end integrally formed with the top wall of the cap on the bottom surface thereof. The bulb potion communicates with the pipette potion through the first end of the pipette portion and the pipette portion has an opening in a second end for receiving and discharging a fluid.

2 Claims, 1 Drawing Sheet

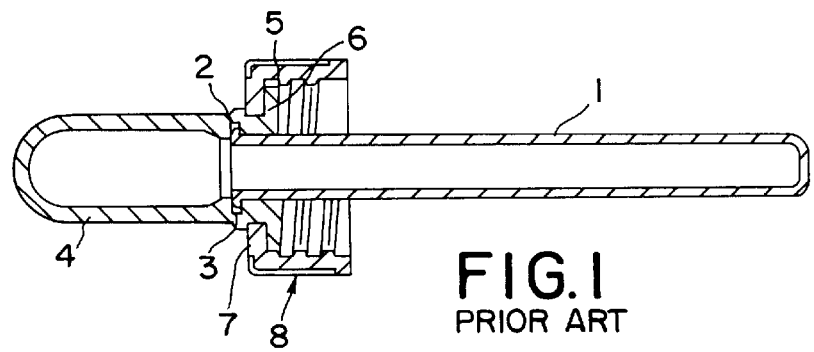
FIG. 1
PRIOR ART
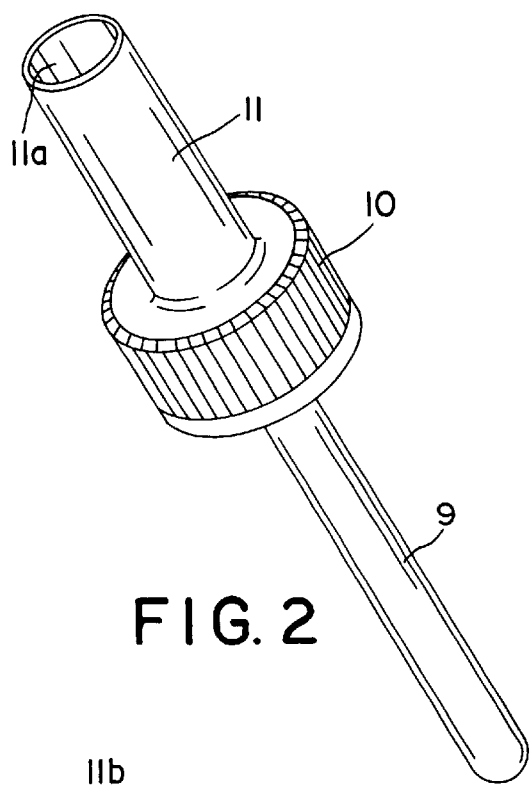
FIG. 2
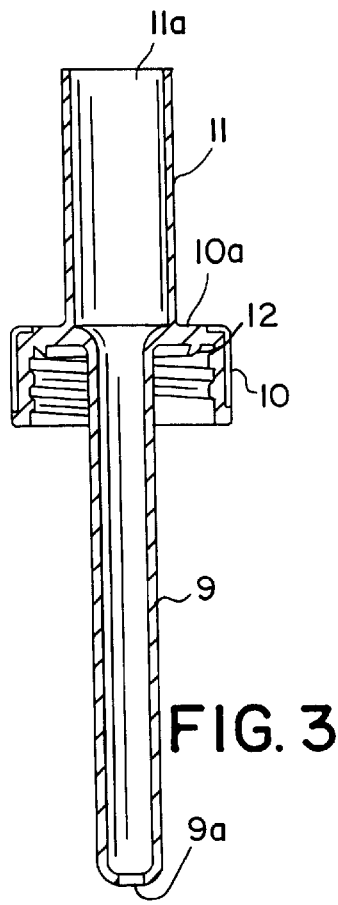
FIG. 3
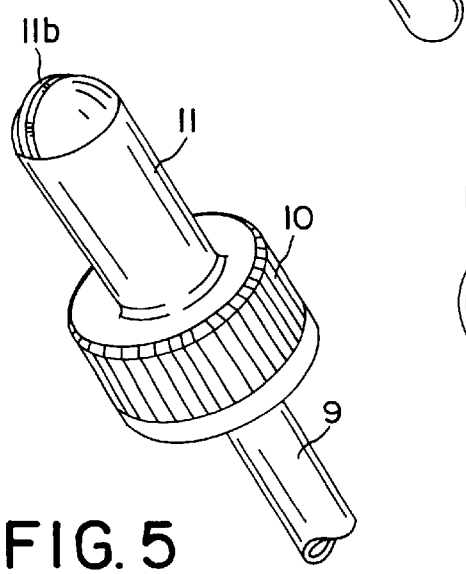
FIG. 4
FIG. 5

ONE-PIECE PIPETTE/DROPPER ASSEMBLY AND THE METHOD OF MAKING SAME

This application claims the benefit of U.S. Provisional Application No. 60/174,188 filed Dec. 29, 1999.

BACKGROUND OF THE INVENTION

Heretofore, multi-piece pipette/dropper assemblies have been proposed, wherein the pipette is detachably connected to a bulb which, in turn, is detachably connected to a threaded cap which provides a closure for a container on which the pipette/dropper assembly is mounted. Multi-piece pipette/dropper assemblies have been characterized by certain disadvantages; most notably, the time and expense required to manufacture the assemblies, wherein the components are separately molded and then connected to form the multi-piece pipette/dropper assembly. Also, when in use, the pipette portion can become separated from the bulb and/or cap resulting in leakage of fluid between the cap and the pipette portion.

To overcome the disadvantages experienced with multi-piece pipette/dropper assemblies, the one piece pipette/dropper assembly of the present invention has been devised.

SUMMARY OF THE INVENTION

The one-piece pipette/dropper assembly of the present invention comprises, essentially, a pipette portion, a bulb portion, and a threaded cap portion, all molded simultaneously to form a one-piece integral unit. The bulb portion can be open-ended for use as a conventional pipette, wherein the finger or thumb of the user is placed over the open end of the bulb portion, or the bulb portion can be closed for use as a conventional dropper, wherein the user squeezes the bulb.

BRIEF DESCRIPTION OF THE DRAWINGS

These and other objects of the present invention and various features and details of the operation and construction thereof are hereinafter more fully set forth with reference to the accompanying drawings, wherein:

FIG. 1 is a sectional, side elevational view of a prior art three-piece dropper;

FIG. 2 is a perspective view of the one-piece pipette/dropper assembly of the present invention;

FIG. 3 is a sectional, side elevational view of the one-piece pipette/dropper assembly showing the open-ended bulb portion shown in FIG. 2;

FIG. 4 is a fragmentary, sectional view of the one-piece pipette/dropper assembly illustrated in FIG. 3 showing the bulb portion closed; and FIG. 5 is a fragmentary perspective view of the one-piece pipette/dropper assembly shown in FIG. 4.

DESCRIPTION OF THE METHOD AND SYSTEM

Referring now to the drawings and particularly to FIG. 1, there is shown a conventional prior art three-piece dropper assembly, wherein a pipette portion 1 is provided with flange 2 on one end thereof for insertion into a groove 3 provided in a bulb portion 4 having an outwardly extending flange 5 positioned between a thread portion 6 and a top wall 7 of a cap 8. The time and expense to manufacture and assemble these three-piece dropper assemblies can be significant; accordingly, the one-piece pipette/dropper assembly of the present invention has been devised.

As shown in FIGS. 2 and 3, the one-piece pipette assembly of the present invention comprises a tubular pipette portion 9, having an open end 9a, a threaded cap portion 10, and a bulb portion 11, having an open end 11a, all molded simultaneously into an integral unit so that what was once the flange portion of the pipette 9 and flange portion of the bulb are no integrally formed with the lower surface and upper surface, respectively, of the top wall 10a of the cap 10, which also includes a claw-styled linerless seal 12 integral with the lower surface of the top wall 10a. Thermoplastic such as the one-piece pipette assembly of the present invention is preferably made of a thermoplastic material such as a polyolefin or a thermoplastic elastomer (TPE).

In use, the pipette portion 9 is inserted into a container of fluid (not shown) and, by capillary attraction, the fluid in the container flows upwardly through the pen end 9a into the pipette portion 9. To hold the fluid in the pipette portion 9, the thumb or finger of the user is placed over the open end 11a of the bulb portion 11, and the pipette portion 9 is lifted out of the container. The fluid is dispensed from the pipette portion by removing the thumb or finger from the open end of the bulb portion 11.

To form a dropper assembly, the open end 11a of the bulb portion 11 is crimped and trimmed as at 11b, as shown in FIGS. 4 and 5. If the bulb portion 11 is heated during the crimping step, the round end shape 11c of the bulb portion 11 can be attained by pressurizing the interior of the bulb portion 11 from the open end 9a of the pipette portion 9. The assembly can then be employed as a dropper, wherein fluid is drawn into and dispensed from the pipette portion 9 by squeezing the bulb 11.

From the above description, it will be appreciated by those skilled in the art that the one-piece pipette/dropper assembly of the present invention is an improvement over the prior art multipiece dropper assemblies in that pipette portion 9, cap portion 10, and bulb portion 11 can be molded simultaneously as an integral unit to first form a pipette assembly, as shown in FIGS. 2 and 3, and then, if desired, to form a dropper assembly, as shown in FIGS. 3 and 4, by crimping the bulb portion, thereby reducing the time and expense to manufacture the assembly.

Even though particular embodiments of the present invention have been illustrated and described herein, it is not intended to limit the invention and changes and modifications may be made therein within the scope of the following claims.

What is claimed is:

1. A one-piece pipette/dropper assembly comprising a pipette portion, a threaded cap portion, and a bulb portion formed integrally as a one-piece assembly by a plastic molding operation, said cap portion having a top wall including a top surface and a bottom surface, said bulb portion having a first end integrally formed with the top wall of the cap on the top surface thereof, said pipette portion having a first end integrally formed with the top wall of the cap on the bottom surface thereof, said bulb portion communicating with said pipette portion through said first end of said pipette portion and an opening in a second end of said pipette portion for receiving and discharging fluid and a claw-shaped seal formed integrally with the interior of the top wall of the cap, said claw-shaped seal comprising a continuous circumferentially extending flange depending from the top wall to seal a container when assembled thereto.

2. A one-piece pipette/dropper assembly comprising a pipette portion, a threaded cap portion, and a bulb portion formed integrally as a one-piece assembly by a plastic molding operation, said cap portion having a top wall including a top surface and a bottom surface, said bulb portion having a first end integrally formed with the top wall of the cap on the top surface thereof, and being of generally cylindrical shape wherein an end opposite said first end of said bulb portion is formed to a closed end by a crimping process using heat and a pressurized medium, said pipette portion having a first end integrally formed with the top wall of the cap on the bottom surface thereof, said bulb portion communicating with said pipette portion through said first end of said pipette portion and an opening in a second end of said pipette portion for receiving and discharging fluid and a claw-shaped seal formed integrally with the interior of the top wall of the cap, said claw-shaped seal comprising a continuous circumferentially extending flange depending from the top wall to seal a container when assembled thereto.

* * * * *